United States Patent
Beyer et al.

(10) Patent No.: US 8,929,521 B2
(45) Date of Patent: Jan. 6, 2015

(54) SYSTEM AND METHOD FOR AUTHENTICATING A COMMUNICATION DEVICE

(75) Inventors: Loraine Beyer, Hoover, AL (US); David Feng-Lin Chen, Fremont, CA (US); Peter Rosencrantz, Boulder, CO (US); Tho Tran, Altamonte Springs, FL (US)

(73) Assignee: AT&T Intellectual Property I, LP, Atlanta, GA (US)

(*) Notice: Subject to any disclaimer, the term of this patent is extended or adjusted under 35 U.S.C. 154(b) by 1859 days.

(21) Appl. No.: 12/061,517

(22) Filed: Apr. 2, 2008

(65) Prior Publication Data

US 2009/0252309 A1   Oct. 8, 2009

(51) Int. Cl.
| | |
|---|---|
| H04M 11/00 | (2006.01) |
| H04L 29/06 | (2006.01) |
| H04M 3/38 | (2006.01) |
| H04W 12/06 | (2009.01) |
| H04M 3/16 | (2006.01) |
| H04M 7/00 | (2006.01) |

(52) U.S. Cl.
CPC ........ H04L 63/0442 (2013.01); H04L 63/0823 (2013.01); H04M 7/006 (2013.01); H04M 3/382 (2013.01); H04W 12/06 (2013.01); H04M 3/16 (2013.01)
USPC .... 379/93.02; 379/118; 379/120; 379/127.06

(58) Field of Classification Search
USPC ............ 379/93.02, 118, 120, 127.06, 207.15
See application file for complete search history.

(56) References Cited

U.S. PATENT DOCUMENTS

| | | | |
|---|---|---|---|
| 7,526,642 B2* | 4/2009 | Hurtta et al. ................... | 713/155 |
| 2003/0200431 A1 | 10/2003 | Stirbu | |
| 2003/0200433 A1 | 10/2003 | Stirbu | |
| 2006/0271693 A1* | 11/2006 | Thiebaut et al. .............. | 709/229 |
| 2007/0150723 A1* | 6/2007 | Estable et al. ................ | 713/155 |
| 2008/0108348 A1* | 5/2008 | Kottilingal et al. ........ | 455/435.1 |

OTHER PUBLICATIONS

S. Dotson, "Certificate of Authentication in SIP", Nov. 6, 2007, 15 pages; published by The IETF Trust.

* cited by examiner

*Primary Examiner* — Duc Nguyen
*Assistant Examiner* — Yosef K Laekemariam
(74) *Attorney, Agent, or Firm* — Guntin & Gust, PLC; Jay H. Anderson

(57) ABSTRACT

A system that incorporates teachings of the present disclosure may include, for example, a communication device having a controller to transmit to a communication system a PKI certificate, and engage in encrypted communications responsive to receiving a public key from the communication system. The communication system can have a plurality of network elements that integrate operations of a circuit-switched communication network and a packet-switched communication network. Other embodiments are disclosed.

18 Claims, 6 Drawing Sheets

US 8,929,521 B2

SYSTEM AND METHOD FOR AUTHENTICATING A COMMUNICATION DEVICE

FIELD OF THE DISCLOSURE

The present disclosure relates generally to authentication techniques in a communication system and more specifically to a system and method for authenticating a communication device.

BACKGROUND

Some telecommunication systems utilize an authentication process to prevent counterfeit communication devices from utilizing their services.

DETAILED DESCRIPTION

One embodiment of the present disclosure entails in an Internet Protocol Multimedia Subsystem (IMS) a method involving receiving a public key infrastructure (PKI) certificate from a communication device, registering the communication device responsive to authenticating the communication device according to the PKI certificate, transmitting a public key of the IMS to the communication device, and engaging in encrypted communications with the communication device.

Another embodiment of the present disclosure entails a communication device having a controller to transmit to a communication system a PKI certificate, and engage in encrypted communications responsive to receiving a public key from the communication system. The communication system can have a plurality of network elements that integrate operations of a circuit-switched communication network and a packet-switched communication network.

Yet another embodiment of the present disclosure entails an authenticator of a certificate authority having a controller to receive from a communication system a PKI certificate of a communication device, authenticate the communication device according to the PKI certificate, and notify the communication system that the PKI certificate is valid.

Figure 1:
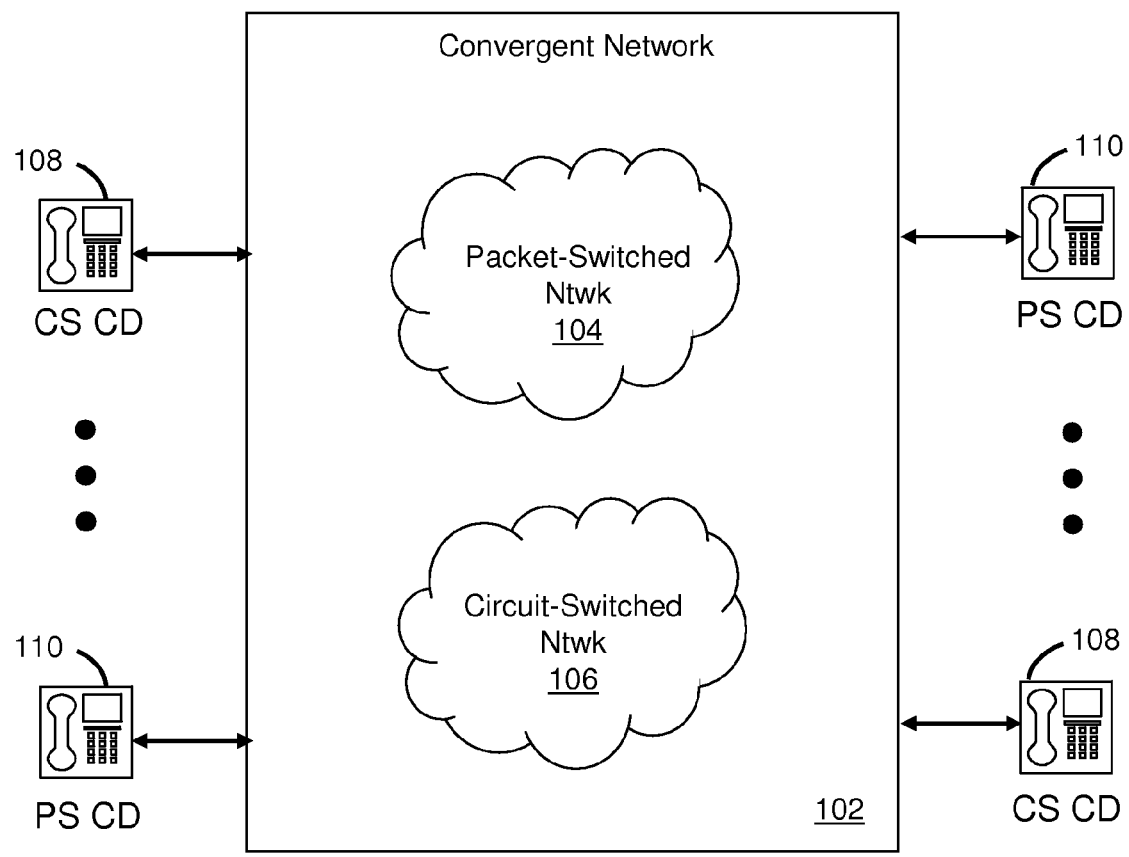
FIG. 1 depicts a communication system.

FIG. 1 depicts an exemplary embodiment of a communication 100 that integrates operations of a packet-switched network 104 with operations of a circuit-switched network 106 in a convergent network architecture 102. The packet-switched network 104 can operate according to a number of protocols that enable voice, video and/or data communications (e.g., Voice over Internet Protocol (VoIP), Session Initiation Protocol (SIP)-based communications, H.323 video communications, Internet data communications, GPRS, EVDO, and so on). The circuit-switched network 106 can operate as a Public Switched Telephone Network (PSTN) and/or cellular network (e.g., GSM, CDMA, UMTS, etc.). The convergent network 102 can provide services to a number of communication devices including among others circuit-switched communication devices 108 (e.g., a PSTN phone, cellular phone) and packet-switched communication devices 110 (e.g., VoIP terminal, cellular phone with GPRS or EVDO, etc.).

Figure 2:
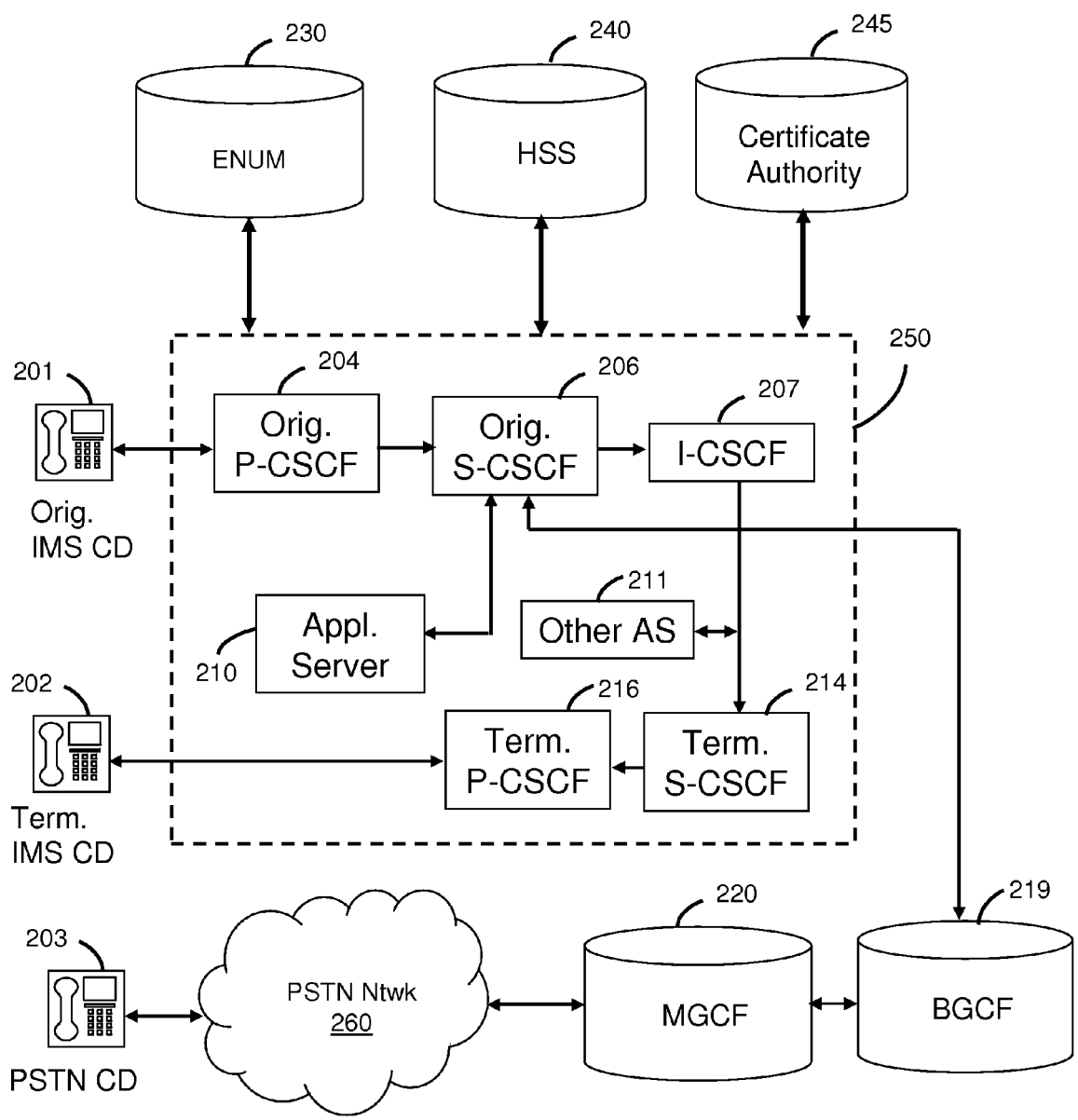
FIG. 2 depicts an exemplary embodiment of the communication system of FIG. 1.

FIG. 2 depicts an exemplary embodiment of a communication system 200 employing an Internet Protocol (IP) Multimedia Subsystem (IMS) network architecture that can be utilized to integrate packet-switched and circuit-switched communication networks such as those illustrated in the communication system 100 of FIG. 1. The communication system 200 can comprise a Home Subscriber Server (HSS) 240, a tElephone NUmber Mapping (ENUM) server 230, and network elements of an IMS network 250. The IMS network 250 can be coupled to IMS compliant communication devices (CD) 201, 202 or a Public Switched Telephone Network (PSTN) CD 203 using a Media Gateway Control Function (MGCF) 220 that connects the call through a common PSTN network 260.

IMS CDs 201, 202 can register with the IMS network 250 by contacting a Proxy Call Session Control Function (P-CSCF) which communicates with a corresponding Serving CSCF (S-CSCF) to register the CDs by way of the HSS 240 using an Authentication and Key Agreement (AKA) presently used by IMS networks, or a PKI certificate authorization process accomplished by way of one or more network elements of a certificate authority 245. Other configurations for authenticating and registering the CD will be discussed. To accomplish a communication session between CDs, an originating IMS CD 201 can submit a SIP INVITE message to an originating P-CSCF 204 which communicates with a corresponding originating S-CSCF 206. The originating S-CSCF 206 can submit the SIP INVITE message to an application server (AS) such as reference 210 that can provide a variety of services to IMS subscribers. For example, the application server 210 can be used to perform originating treatment functions on the calling party number received by the originating S-CSCF 206 in the SIP INVITE message.

Originating treatment functions can include determining whether the calling party number has international calling services, and/or is requesting special telephony features (e.g., *72 forward calls, *73 cancel call forwarding, *67 for caller ID blocking, and so on). Additionally, the originating S-CSCF 206 can submit queries to the ENUM system 230 to translate an E.164 telephone number to a SIP Uniform Resource Identifier (URI) if the targeted communication device is IMS compliant. If the targeted communication device is a PSTN device, the ENUM system 230 will respond with an unsuccessful address resolution and the S-CSCF 206 will forward the call to the MGCF 220 via a Breakout Gateway Control Function (BGCF) 219.

When the ENUM server 230 returns a SIP URI, the SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214 which can call on an application server 211 similar to reference 210 to perform the originating treatment telephony functions described earlier. The terminating S-CSCF 214 can then identify a terminating P-CSCF 216 associated with the terminating CD 202. The P-CSCF 216 then signals the CD 202 to establish communications. The aforementioned process is symmetrical. Accordingly, the terms "originating" and "terminating" in FIG. 2 can be interchanged.

Figure 3:
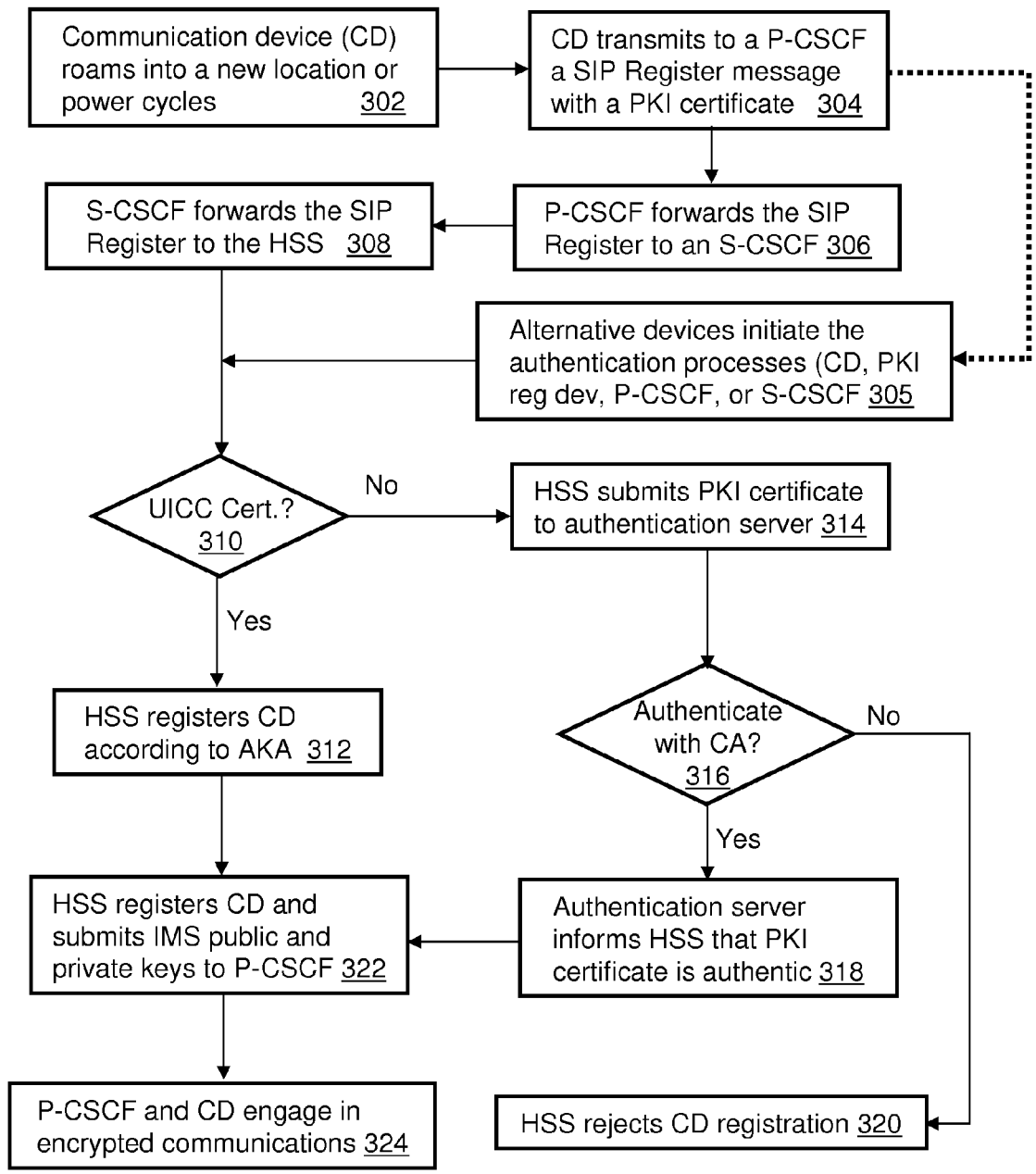
FIG. 3 depicts an exemplary method operating in portions of the communication system.

FIG. 3 depicts an exemplary method 300 operating in portions of communication systems 100-200. Method 300 begins with step 302 in which a communication device such as the ones discussed in FIGS. 1-2 roams into a new location served by a different network element of communication system, or power cycles thereby requiring re-registration with the communication system. The communication system can also require re-registration on a periodic basis as a preventative measure against counterfeit devices.

To begin the registration process, the communication device transmits in step 304 a SIP Register message to a P-CSCF in a vicinity of the communication device. The SIP Register can include a PKI certificate for authentication purposes. The PKI certificate can be an X.509 certificate with an IMS private identifier (IMPI) that uniquely identifies the communication device. The P-CSCF forwards the SIP Register in step 306 to an S-CSCF which in turn forwards it in step 308 to the HSS to authenticate and register the communication device. There are other exemplary configurations for authenticating the communication device which will be discussed shortly.

If the HSS determines in step 310 that the communication device is utilizing a Universal Integrated Circuit Card (UICC), the HSS registers the communication device in step 312 according to AKA as presently used by IMS networks. If the HSS recognizes from the IMPI that the communication device requires authentication with a PKI certificate rather than with a UICC, the HSS proceeds from step 310 to step 314. In step 314 the HSS submits the PKI certificate to an authentication server of the certificate authority 245. The authentication server authenticates the PKI certificate supplied by the communication device by accessing a database managed by the certificate authority and matching one or more items of the X.509 certificate (e.g., name, address, account information, etc.) to one of a number of subscribers who have been issued X.509 certificates. In this illustration, the authentication server acts as the authenticator, while the database of the certificate authority acts as the authentication center.

If the PKI certificate is not recognized in step 316, the authentication server notifies the HSS which then rejects the registration of the communication device in step 320 by informing the downstream P-CSCF which initially conveyed the registration request. The P-CSCF can then notify the communication device that registration has failed, and that communication services cannot be provided. If on the other hand the PKI certificate is determined to be valid in step 316, the authentication server informs the HSS in step 318, which registers the communication device and submits in step 322 IMS public and private keys to the P-CSCF to engage in encrypted communications in step 324 with the communication device according to the flow diagram of FIG. 6.

Figure 6:
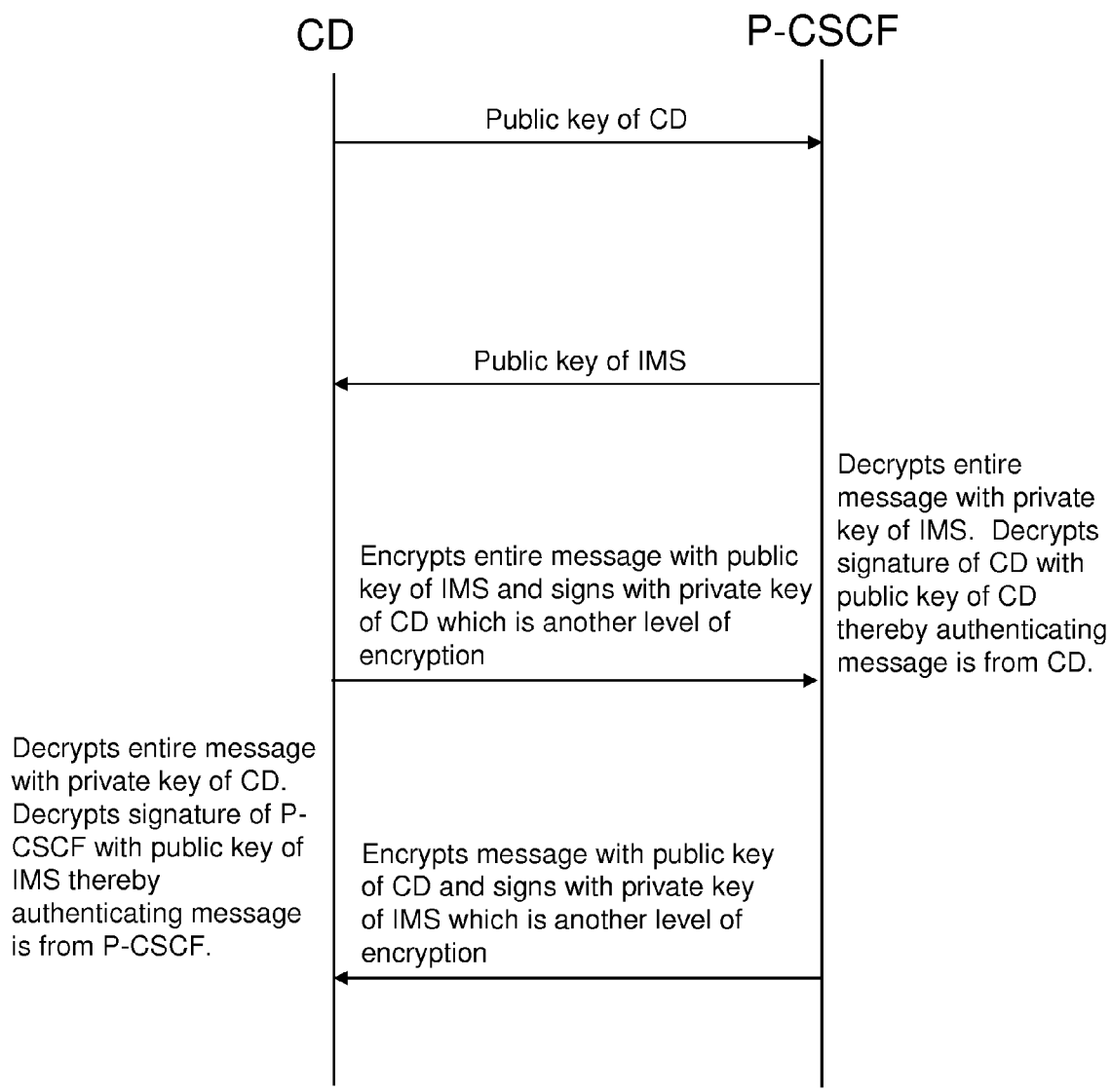
FIG. 6 depicts an exemplary flow diagram for transmitting encrypted messages.

As depicted in FIG. 6, the communication device and the P-CSCF exchange their respective public keys. This step can be reduced in part by the P-CSCF retrieving the public key from the PKI certificate initially transmitted by the communication device during the registration process. Once each device has the public key of the other, the devices encrypt messages with the public key of the other device and sign it with its own private key. The recipient of the encrypted messages decrypts the entire message with its private key, and decrypt the signature of the sending party with the sending party's public key.

The encrypted communication process depicted in FIG. 6 improves security since the private keys of each device are required to engage in encrypted communications. For example, if a device registration took place falsely such as by a counterfeit device utilizing a stolen X.509 certificate, communications would not be possible even if the device was successfully authenticated and registered since the counterfeit device would not be able to engage in encrypted communications with the P-CSCF without the private key of the legitimate communication device from which the X.509 certificate was stolen.

Figure 4:
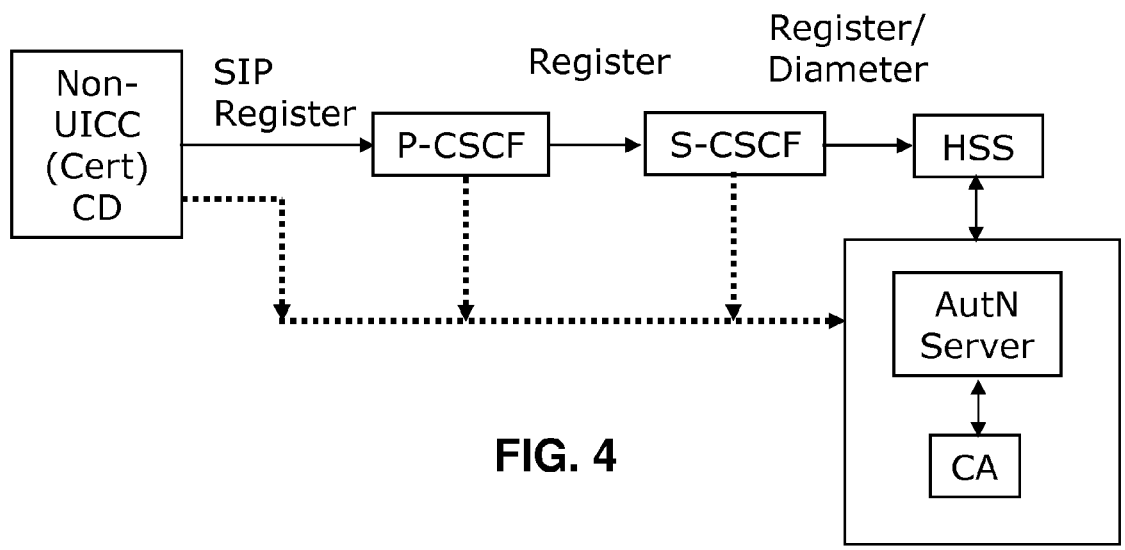
FIGS. 4-5 depict exemplary embodiments of the method of FIG. 3.

As noted earlier, other configurations can be used to authenticate the communication device. For example, communication devices utilizing PKI certificates can be given direct access to the authentication server to perform the authentication process prior to engaging with a P-CSCF without the assistance of any IMS network elements. In this embodiment, the HSS can be informed by the authentication server when the communication device has been authenticated by the process described earlier. Consequently, when the HSS receives a SIP Register initiated by the communication device which has been pre-registered by a previous authentication process taking place between the communication device and the authentication server, registration can take place immediately. In a similar manner, the P-CSCF or the S-CSCF can be directed to perform the authentication process directly with the authentication server without the assistance of the HSS. These illustrative embodiments are shown in FIG. 4.

Figure 5:
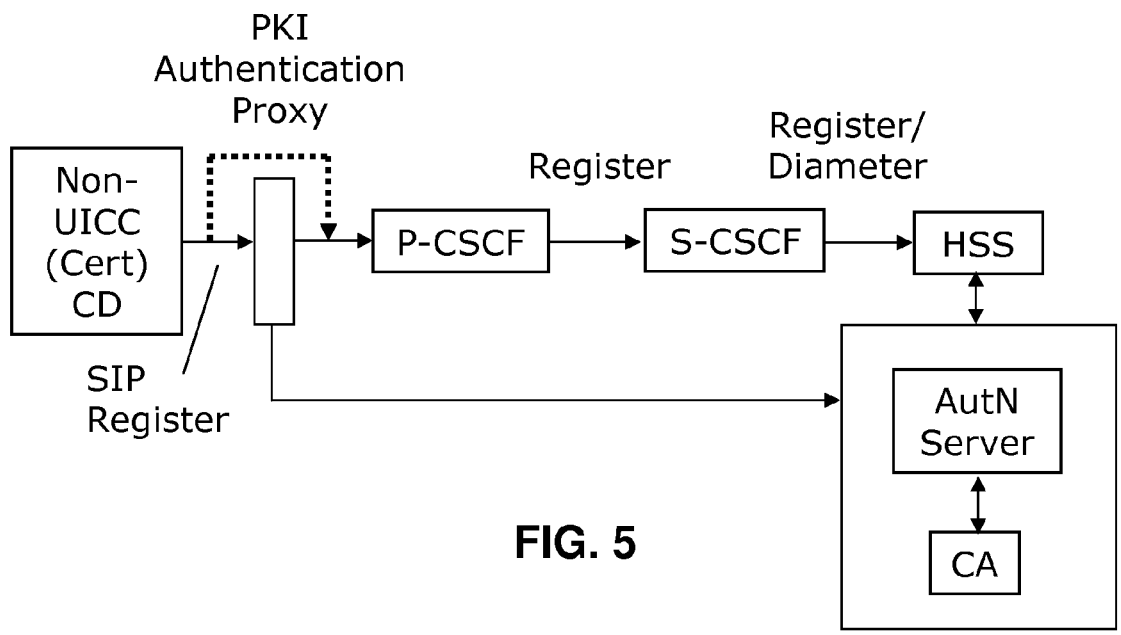

In yet another illustrative embodiment, a PKI Authentication Proxy which performs the authentication functions described above can be placed between the communication device and the P-CSCF to authenticate the communication device before it communicates with a P-CSCF to initiate a registration process. Once the communication device has been successfully registered at the HSS, the PKI Authentication Proxy can operate as a pass-through device or the communication device can be provided a direct link for establishing communications with the P-CSCF and begin the registration process with a SIP register. This illustrative embodiment is shown in FIG. 5. The PKI Authentication Proxy provides a means to authenticate communication devices with PKI certificates with minimal impact or modification to the IMS network (e.g., HSS can be modified to accept authentications from the PKI Authentication Proxy, while intermediate CSCFs remain unchanged).

It would be evident to one of ordinary skill in the art from these illustrations that there can be other network elements and/or configurations which can be used to authenticate the communication device with a certificate authority.

Upon reviewing the aforementioned embodiments, it would be evident to an artisan with ordinary skill in the art that said embodiments can be modified, reduced, or enhanced without departing from the scope and spirit of the claims described below. For example, method 300 can be adapted so that rather than transmitting the PKI certificate with the SIP Register, the authentication server can direct the communication device to exchange public keys with the authentication server, and thereafter exchange PKI certificates for mutual authentication using the encryption process of FIG. 6. In another illustrative embodiment, the authentication server can be securely linked with the HSS (e.g., a leased or dedicated communication link), or can be located in a secure facility thereby foregoing a need for the HSS and the authentication server to exchange PKI certificates to authenticate each other and engage in the authentication process described above using encryption.

Other suitable modifications can be applied to the present disclosure without departing from the scope of the claims below. Accordingly, the reader is directed to the claims section for a fuller understanding of the breadth and scope of the present disclosure.

Figure 7:
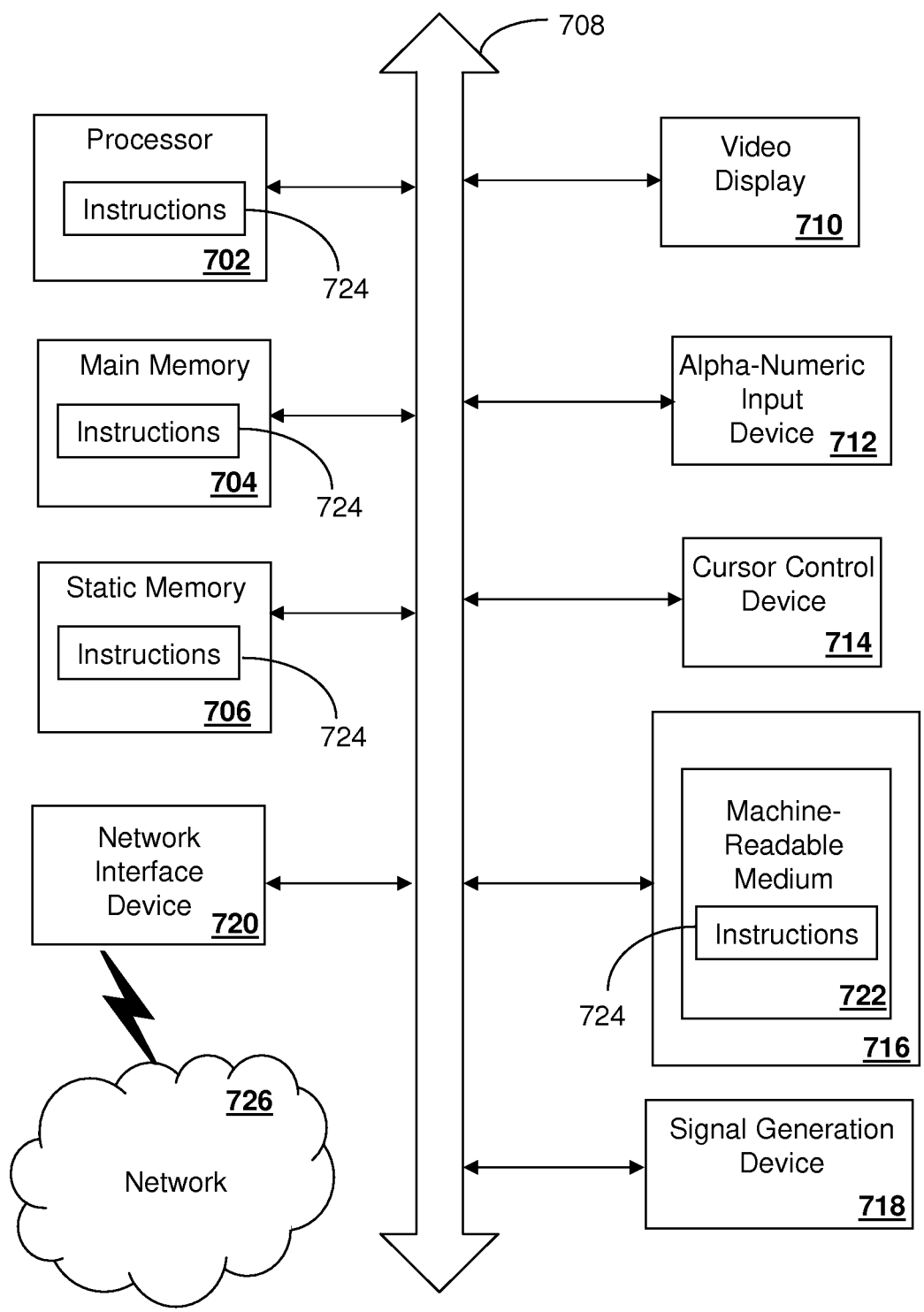
FIG. 7 is a diagrammatic representation of a machine in the form of a computer system within which a set of instructions, when executed, may cause the machine to perform any one or more of the methodologies discussed herein.

FIG. 7 depicts an exemplary diagrammatic representation of a machine in the form of a computer system 700 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   generating and providing a re-registration request to a communication device, wherein re-registration requests are periodically generated;
   responsive to the providing of the re-registration request, receiving, by a proxy call session control function server, a session initiation protocol register message including a public key infrastructure certificate from the communication device, wherein the proxy call session control function server is part of an internet protocol multimedia subsystem network;
   registering, by the proxy call session control function server, the communication device responsive to an authentication of the communication device according to the public key infrastructure certificate;
   transmitting, by the proxy call session control function server, a public key of the internet protocol multimedia subsystem network to the communication device responsive to the authentication of the communication device according to the public key infrastructure certificate; and
   engaging, by the proxy call session control function server, in encrypted communications with the communication device.

2. The method of claim 1, comprising receiving a public key of the communication device to encrypt messages directed to the communication device, wherein the public key of the communication device is received by the proxy call session control function server in response to the transmitting of the public key of the internet protocol multimedia subsystem network to the communication device.

3. The method of claim 1, comprising retrieving a public key of the communication device from the public key infrastructure certificate to encrypt messages directed to the communication device.

4. The method of claim 1, comprising authenticating the public key infrastructure certificate with a certificate authority.

5. The method of claim 1, wherein the authentication is performed by a home subscriber server in communication with an authentication server.

6. The method of claim 1, comprising registering the communication device at a home subscriber server responsive to authenticating the communication device with the public key infrastructure certificate, wherein the session initiation protocol register message is received by the proxy call session control function server in response to a power cycling of the communication device.

7. The method of claim 6, comprising:
   the home subscriber server transmitting to the proxy call session control function server the public key of the internet protocol multimedia subsystem network and a private key of the internet protocol multimedia subsystem network; and
   the proxy call session control function server engaging in encrypted communications with the communication device according to the public key and private key pair of the internet protocol multimedia subsystem network.

8. The method of claim 1, comprising home subscriber server authenticating the communication device with the public key infrastructure certificate.

9. The method of claim 1, wherein the pubic key infrastructure certificate is signed by the communication device, wherein the session initiation protocol register message is received by the proxy call session control function server in response to roaming of the communication device into a different service area.

10. The method of claim 1, wherein the public key infrastructure certificate conforms to an X.509 standard, and wherein the public key infrastructure certificate comprises an internet protocol multimedia subsystem private identifier, and wherein the communication system determines from the internet protocol multimedia subsystem private identifier that the communication device requires authentication with the public key infrastructure certificate.

11. A communication device, comprising:
   a memory storing computer instructions; and
   a controller coupled with the memory, wherein the controller, responsive to executing the computer instructions, performs operations comprising:
   receiving a re-registration request generated by and received from a communication system, wherein re-registration requests are periodically generated by the communication system;
   responsive to the receiving of the re-registration request, transmitting to a proxy call session control function server of the communication system a session initiation protocol register message including a public key infrastructure certificate for authenticating, wherein the communication system comprises an internet protocol multimedia subsystem network that integrates operations of a circuit-switched communication network and a packet-switched communication network, wherein the proxy call session control function server registers the communication device responsive to an authentication of the communication device according to the public key infrastructure certificate;
   receiving a public key from the proxy call session control function server of the communication system in response to an authentication of the communication device according to the public key infrastructure certificate by the communication system; and
   engaging via the proxy call session control function server in encrypted communications utilizing the public key from the communication system.

12. The communication device of claim 11, wherein the circuit switched communication network corresponds to a public switched telephone network.

13. The communication device of claim 11, wherein the public key infrastructure certificate conforms to an X.509 standard.

14. The communication device of claim 11, wherein the controller is adapted to sign the public key infrastructure certificate with a private key.

15. The communication device of claim 11, wherein the communication device corresponds to a cellular communication device.

16. A proxy call session control function server, comprising:
   a memory storing computer instructions; and
   a controller coupled with the memory, wherein the controller, responsive to executing the computer instructions, performs operations comprising:
      generating and providing a re-registration request to a communication device, wherein re-registration requests are periodically generated;
      responsive to the providing of the re-registration request, receiving, by the proxy call session control function server, a session initiation protocol register message including a public key infrastructure certificate from the communication device, wherein the proxy call session control function server is part of an internet protocol multimedia subsystem network;
      registering, by the proxy call session control function server, the communication device responsive to an authentication of the communication device according to the public key infrastructure certificate;
      transmitting, by the proxy call session control function server, a public key of the internet protocol multimedia subsystem network to the communication device responsive to the authentication of the communication device according to the public key infrastructure certificate; and
      engaging, by the proxy call session control function server, in encrypted communications with the communication device.

17. The proxy call session control function server of claim 16, wherein the public key infrastructure certificate conforms to an X.509 standard, and wherein the public key infrastructure certificate is signed by the communication device with a private key.

18. The proxy call session control function server of claim 16, wherein the communication device comprises a wireline communication device.

* * * * *